(12) United States Patent
Lin

(10) Patent No.: US 10,261,731 B2
(45) Date of Patent: Apr. 16, 2019

(54) IMAGE PROCESSING APPARATUS CAPABLE OF PERFORMING RESERVATION PRINTING PROCESS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Zhi Lin, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/045,824

(22) Filed: Feb. 17, 2016

(65) Prior Publication Data

US 2016/0246549 A1  Aug. 25, 2016

(30) Foreign Application Priority Data

Feb. 23, 2015 (JP) .................. 2015-032775

(51) Int. Cl.
*G06F 3/12* (2006.01)
*H04N 1/00* (2006.01)

(52) U.S. Cl.
CPC .......... *G06F 3/1212* (2013.01); *G06F 3/1213* (2013.01); *G06F 3/1263* (2013.01);
(Continued)

(58) Field of Classification Search
CPC .... G06F 3/1212; G06F 3/1263; G06F 3/1267; G06F 3/1273; G06F 3/1213; G06F 3/1285; G06F 3/1291; H04N 1/00923
(Continued)

(56) References Cited

U.S. PATENT DOCUMENTS

| | | | | |
|---|---|---|---|---|
| 2002/0131069 A1* | 9/2002 | Wanda | .................... | G06F 3/121 358/1.14 |
| 2005/0094175 A1* | 5/2005 | Christiansen | .......... | G06F 3/122 358/1.13 |

(Continued)

FOREIGN PATENT DOCUMENTS

| | | |
|---|---|---|
| JP | 2005004798 A | 1/2005 |
| JP | 2005153418 A | 6/2005 |
| JP | 2013129131 A | 7/2013 |

OTHER PUBLICATIONS

Office Action issued in Japanese Appln. No. 2015-032775 dated Oct. 16, 2018.

*Primary Examiner* — Gabriel I Garcia
(74) *Attorney, Agent, or Firm* — Rossi, Kimms & McDowell LLP

(57) ABSTRACT

An image processing apparatus that is capable of preventing FPOT (First Print Output Time) from becoming longer beyond necessity. A selection unit selects a first print job that uses print data reserved in the image processing apparatus and a second print job that requires transfer of print data from another image processing apparatus. A print-job execution unit performs the first print job and the second print job selected by the selection unit. A control unit controls a printing order of the print-job execution unit so that the first print job is performed prior to performing the second print job when the execution of the first print job and the second print job is instructed.

15 Claims, 11 Drawing Sheets

(52) U.S. Cl.
CPC .......... *G06F 3/1267* (2013.01); *G06F 3/1273* (2013.01); *G06F 3/1285* (2013.01); *G06F 3/1291* (2013.01); *H04N 1/00923* (2013.01); *G06F 3/1222* (2013.01); *G06F 3/1238* (2013.01)

(58) Field of Classification Search
USPC ..... 358/1.1, 1.13, 1.14, 1.15, 1.18, 402, 448
See application file for complete search history.

(56) References Cited

U.S. PATENT DOCUMENTS

| | | | |
|---|---|---|---|
| 2005/0134889 A1* | 6/2005 | Nakazawa | G06F 3/1204 358/1.13 |
| 2007/0046973 A1* | 3/2007 | Toda | G06F 3/121 358/1.13 |
| 2009/0128853 A1* | 5/2009 | Kusakabe | G06F 3/1204 358/1.15 |
| 2011/0016164 A1* | 1/2011 | Maeshima | G06F 17/3028 707/813 |
| 2011/0273733 A1* | 11/2011 | Moriyama | H04N 1/603 358/1.9 |
| 2012/0057191 A1* | 3/2012 | Gnanasambandam | G06F 3/1211 358/1.15 |
| 2012/0075662 A1* | 3/2012 | Giannetti | G06F 3/1217 358/1.15 |
| 2013/0083359 A1* | 4/2013 | Ishigure | H04N 1/00347 358/1.15 |
| 2014/0104635 A1* | 4/2014 | Nishikawa | H04N 1/00238 358/1.14 |

\* cited by examiner

- 300
- 301 STORING CONTROL MODULE
- 302 CONTROL MODULE
- 303 SETTING MODULE
- 304 PRINTING MODULE
- 305 COMMUNICATION MODULE

| | | 400 |
|---|---|---|
| 401 | JOB NAME | AA |
| 402 | JOB OWNER NAME | User X |
| 403 | DATE | 2015/01/13 |
| 404 | PRINT SETTING | xxxxx |
| 405 | STORAGE LOCATION | 11.22.33.44 |
| 406 | PRINTING-POSSIBLE STATE | OK |
| 407 | PRINTING STATE | PRINTING |
| 408 | TRANSFERRING STATE | TRANSFERRING |

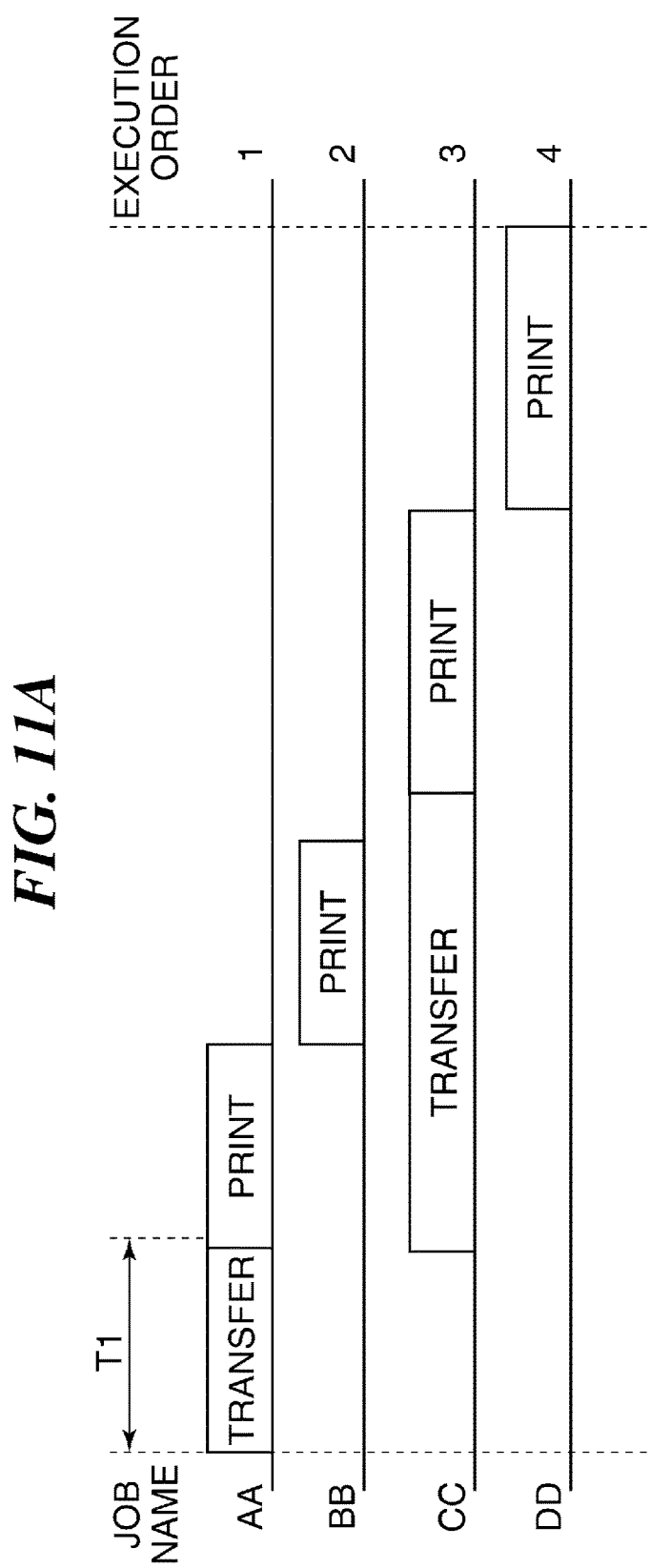

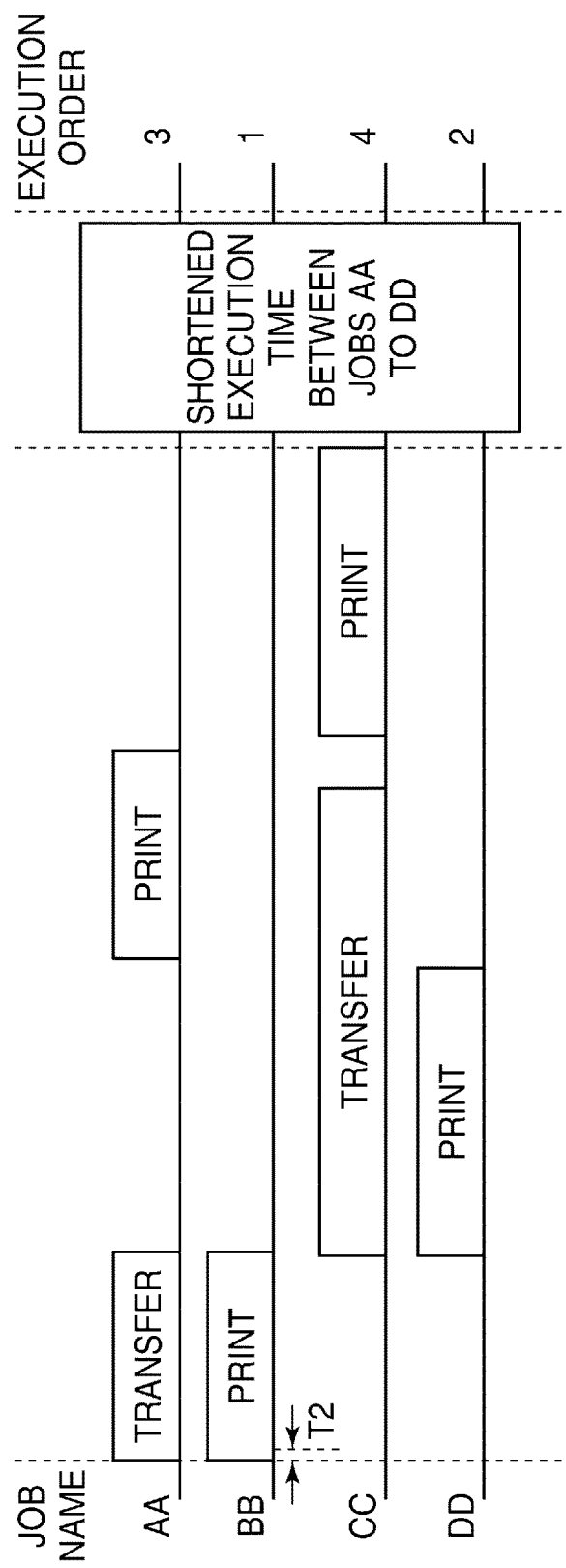

FIG. 12A

| JOB NAME | STORAGE LOCATION | PRINTING-POSSIBLE STATE | PRINTING STATE |
|---|---|---|---|
| AA | REMOTE | NG | |
| BB | LOCAL | OK | |
| CC | REMOTE | NG | |
| DD | LOCAL | OK | |

FIG. 12B

| JOB NAME | STORAGE LOCATION | PRINTING-POSSIBLE STATE | PRINTING STATE |
|---|---|---|---|
| AA | REMOTE | NG | |
| BB | LOCAL | OK | PRINTING |
| CC | REMOTE | NG | |
| DD | LOCAL | OK | |

FIG. 12C

| JOB NAME | STORAGE LOCATION | PRINTING-POSSIBLE STATE | PRINTING STATE |
|---|---|---|---|
| AA | REMOTE | NG | |
| CC | REMOTE | NG | |
| DD | LOCAL | OK | |

FIG. 12D

| JOB NAME | STORAGE LOCATION | PRINTING-POSSIBLE STATE | PRINTING STATE |
|---|---|---|---|
| AA | REMOTE | OK | |
| CC | REMOTE | NG | |
| DD | LOCAL | OK | |

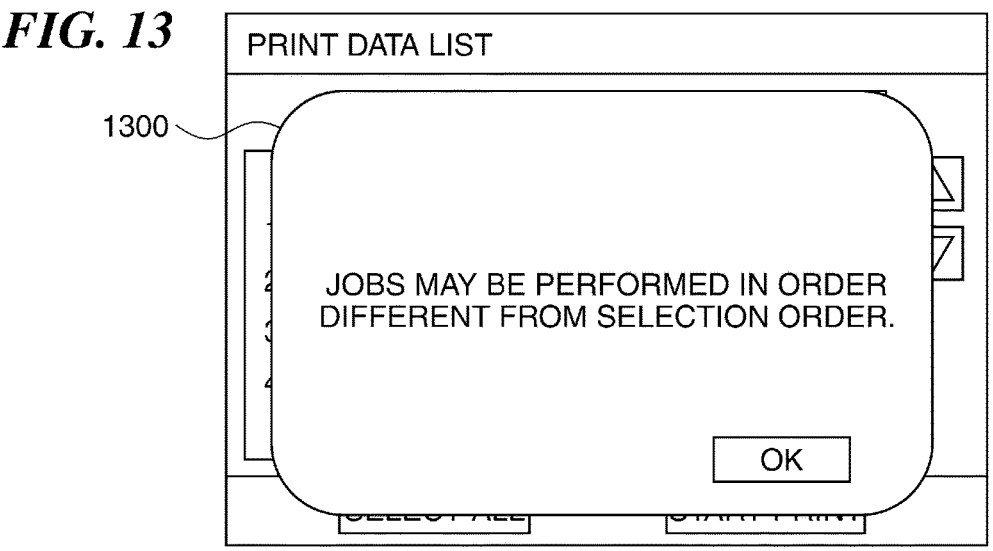

IMAGE PROCESSING APPARATUS CAPABLE OF PERFORMING RESERVATION PRINTING PROCESS, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus, a control method therefor, and a storage medium storing a control program therefor, and in particular, relates to an image processing apparatus that is capable of performing a reservation printing process, a control method therefor, and a storage medium storing a control program therefor.

Description of the Related Art

An MFP, which is an image processing apparatus that is capable of performing a reservation printing, receives print data for performing a printing process from a client PC or the like, and reserves the print data concerned without performing the printing process for the received print data immediately.

In general, an MFP is able to reserve a plurality of sets of print data. When a user who transmitted print data from a client PC logs in to an MFP and instructs the MFP to perform a printing process by selecting at least one print data among a plurality of sets of print data, the MFP performs the printing process for the selected print data. Furthermore, the MFP performs a data communication with another MFP that is capable of performing a reservation printing. When other print data reserved in the other MFP is transferred from the other MFP, the MFP can perform the printing process for the other print data.

An MFP displays a print data list screen for selecting print data used for a printing process that will be performed. The printing processes for sets of print data selected by a user are performed in a performing order according to a specification of the MFP (for example, see Japanese Laid-Open Patent Publication (Kokai) No. 2005-004798 (JP 2005-004798A)) or according to the selection order of the sets of print data selected by the user in the print data list screen.

However, when the printing processes for a plurality of sets of print data are performed according to the selection order selected by the user, a period (hereinafter referred to as "FPOT (First Print Output Time)") required until a first printed result is ejected from a user's instruction to perform the printing process (hereinafter referred to as a "printing execution instruction") may become long.

Specifically, when the user selects so as to print the other print data that is reserved in the other MFP (hereinafter referred to as "remotely reserved print data") before printing the print data reserved in the MFP that performs the printing process (hereinafter referred to as "locally reserved print data"), the printing process starts on the basis of the remotely reserved print data after the transfer of the remotely reserved print data from the other MFP is completed. That is, since the first printing process is not executed unless the transfer of the remotely reserved print data is completed, the FPOT becomes long.

SUMMARY OF THE INVENTION

The present invention provides an image processing apparatus, a control method therefor, and a storage medium storing a control program therefor, which are capable of preventing the FPOT from becoming longer beyond necessity.

Accordingly, a first aspect of the present invention provides an image processing apparatus comprising a selection unit configured to select a first print job that uses print data reserved in the image processing apparatus and a second print job that requires transfer of print data from another image processing apparatus, a print-job execution unit configured to perform the first print job and the second print job selected by the selection unit, and a control unit configured to control a printing order of the print-job execution unit so that the first print job is performed prior to performing the second print job when the execution of the first print job and the second print job is instructed.

Accordingly, a second aspect of the present invention provides a control method for an image processing apparatus, the control method comprising a selection step of selecting a first print job that uses print data reserved in the image processing apparatus and a second print job that requires transfer of print data from another image processing apparatus, a print-job execution step of performing the first print job and the second print job selected in the selection step, and a control step of controlling a printing order in the print-job execution step so that the first print job is performed prior to performing the second print job when the execution of the first print job and the second print job is instructed.

Accordingly, a third aspect of the present invention provides a non-transitory computer-readable storage medium storing a control program causing a computer to execute the control method of the second aspect.

According to the present invention, the FPOT is prevented from becoming longer beyond necessity.

Further features of the present invention will become apparent from the following description of exemplary embodiments with reference to the attached drawings.

BRIEF DESCRIPTION OF THE DRAWINGS

FIG. 8A shows a case where a plurality of sets of print data are selected individually, and FIG. 8B shows a case where all sets of print data are selected by pressing a select-all button.

FIG. 11A and FIG. 11B are views showing examples of sequences of print jobs executed by the MFP in FIG. 1. FIG.

11A shows a case where a remotely reserved print job is performed first, and FIG. 11B shows a case where a locally reserved print job is performed first.

FIG. 12A, FIG. 12B, FIG. 12C, and FIG. 12D are views showing print job lists used by the MFP in FIG. 1. FIG. 12A shows the print job list displayed before performing any print jobs. FIG. 12B shows the print job list displayed when one print job is being performed. FIG. 12C shows the print job list displayed when one print job is completed. FIG. 12D shows the print job list displayed when transfer of print data used for one print job is completed.

FIG. 13 is a view showing a notice displayed on the display unit in FIG. 2.

FIG. 14A, FIG. 14B, and FIG. 14C are views showing transfer control lists used by the MFP in FIG. 1. FIG. 14A shows a case before performing a transfer process. FIG. 14B shows a case where print data is being transferred. FIG. 14C shows a case where the transfer of the print data has been completed.

DESCRIPTION OF THE EMBODIMENTS

Hereafter, embodiments according to the present invention will be described in detail with reference to the drawings.

Figure 1:
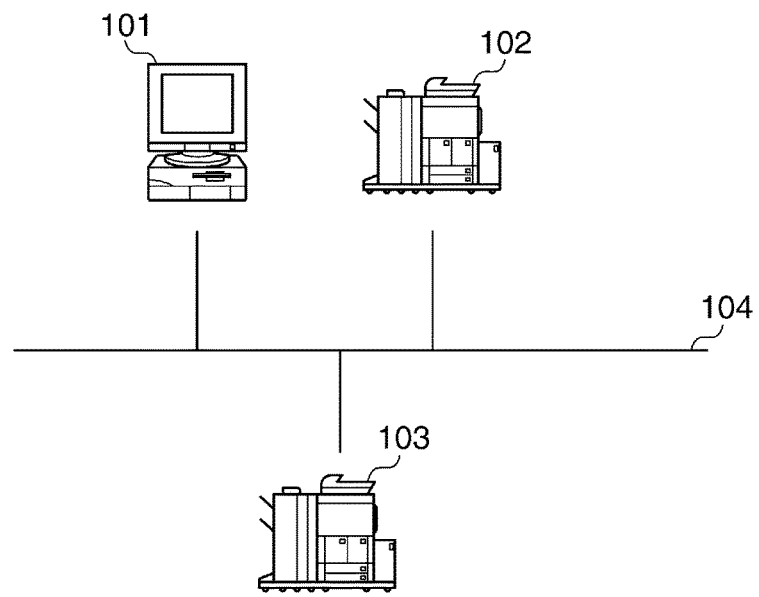
FIG. 1 is a network diagram schematically showing a communication system including an MFP as an image processing apparatus according to an embodiment of the present invention.

FIG. 1 is a network diagram schematically showing a communication system 100 including an MFP 102 as an image processing apparatus according to an embodiment of the present invention.

As shown in FIG. 1, the communication system 100 is provided with a client PC 101 as an information processing apparatus, and MFPs 102 and 103. The client PC 101 and the MFPs 102 and 103 are mutually connected through a network 104.

The client PC 101 transmits various jobs, such as print data for performing a print job, to the MFPs 102 and 103 through the network 104. Each of the MFPs 102 and 103 is provided with a printing function, a scanning function, etc., and is able to perform a reservation printing.

In the reservation printing, even when receiving print data from the client PC 101, each of the MFPs 102 and 103 (the MFP 102, for example) reserves the print data concerned without performing the print job for the received print data immediately. After that, when a user who instructed the client PC 101 to transmits the above-mentioned print data logs in the MFP 102 and instructs the MFP 102 to perform the print job for the locally reserved print data (hereinafter referred to as a "locally reserved print job"), the MFP 102 performs the locally reserved print job according to the performing instruction concerned. Moreover, when other print data reserved in the MFP 103 is transferred to the MFP 102 from the MFP 103 and the transfer is completed, the MFP 102 is able to perform the print job for the other reserved print data (hereinafter referred to as a "remotely reserved print job").

Next, the configuration of the MFPs 102 and 103 will be described. Since the MFPs 102 and 103 have the same configuration in the embodiment, the configuration of the MFP 102 will be described hereinafter as an example.

Figure 2:
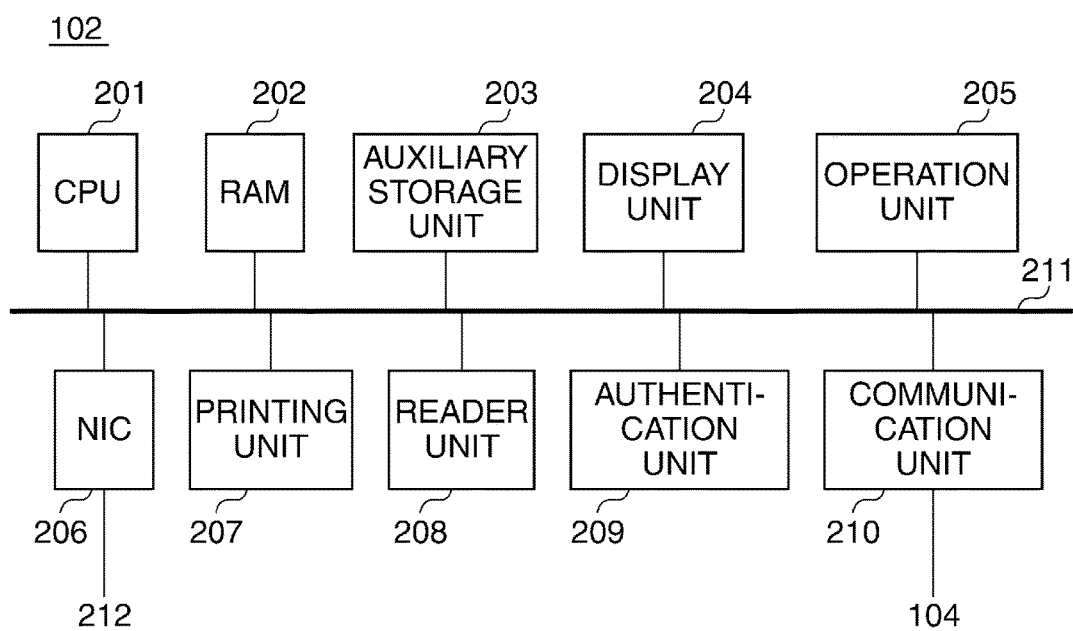
FIG. 2 is a block diagram schematically showing a configuration of the MFP in FIG. 1.

FIG. 2 is a block diagram schematically showing the configuration of the MFP 102 in FIG. 1.

As shown in FIG. 2, the MFP 102 has a CPU 201, a RAM 202, an auxiliary storage unit 203, a display unit 204, an operation unit 205, a NIC (Network Interface Card) 206, a printing unit 207, a reader unit 208, an authentication unit 209, and a communication unit 210. These members are mutually connected through a main bus 211.

The CPU 201 totally controls the entire MFP 102. In the embodiment, various controls are performed by executing modules of a software module 300 (described below with reference to FIG. 3) that are read and developed to the RAM 202. The RAM 202 is used as a working area of the CPU 201, and is used as a temporary storage area for various data. The auxiliary storage unit 203 that includes a hard disk, a CD-ROM, etc. and stores various control programs and various data used by the MFP 102.

Figure 5:
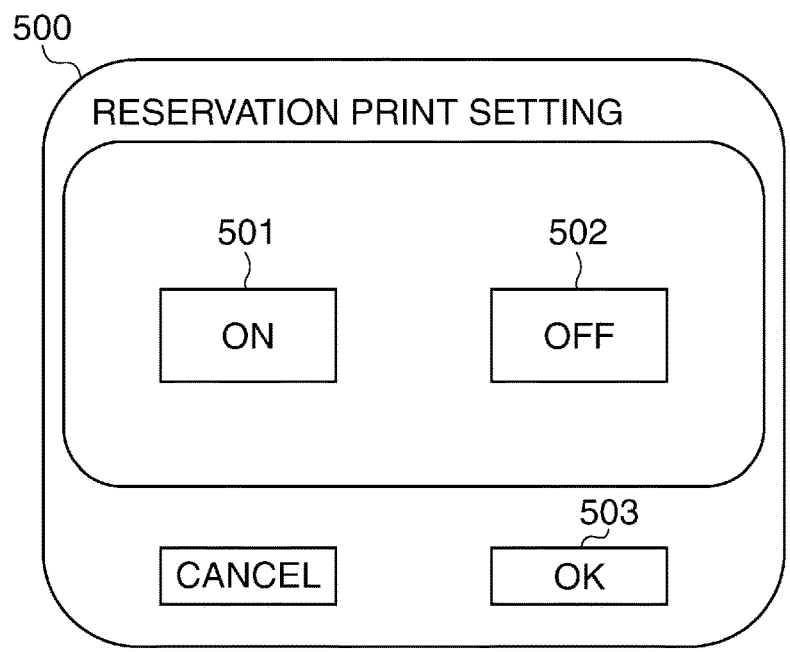
FIG. 5 is a view showing a reservation print setting screen displayed on a display unit in FIG. 2.
Figure 6:
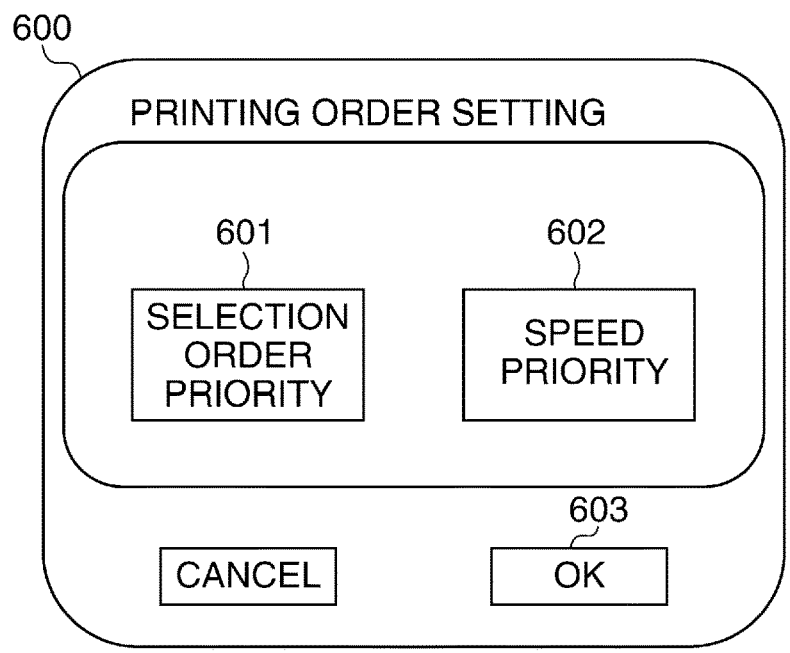
FIG. 6 is a view showing a printing order setting screen displayed on the display unit in FIG. 2.

Moreover, the auxiliary storage unit 203 is used as a temporary storage area for various data instead of the RAM 202. The display unit 204 displays a setting screen for various settings of the MFP 102. In the embodiment, the display unit 204 displays a reservation print setting screen 500 that is used for setting a reservation printing and is shown in FIG. 5 mentioned later, and a printing order setting screen 600 that is used for setting modes about a reservation printing and is shown in the FIG. 6 mentioned later.

The operation unit 205 is provided with a ten-key pad, an execution button for instructing execution of various jobs, etc., and transmits input information input by a user to the CPU 201. The NIC 206 performs data communication with various apparatuses that are connected through a LAN 212. The printing unit 207 prints an image on a recording sheet on the basis of print data. The reader unit 208 obtains image information from an original on an original tray (not shown), and generates monochrome binary image data or color multiple value image data on the basis of the obtained image information.

The authentication unit 209 performs a user authentication for a registered user. For example, the user authentication is performed when a user holds an IC card in which user information is recorded up over the authentication unit 209, or when a user inputs user information in a login screen displayed on the display unit 204.

The communication unit 210 performs data communications with the client PC 101 and the MFP 103 that are connected through the network 104. In the embodiment, when the MFP 102 performs the remotely reserved print job reserved in the MFP 103, the communication unit 210 receives the remotely reserved print data transferred from the MFP 103 through the network 104.

Figures 3, 4:
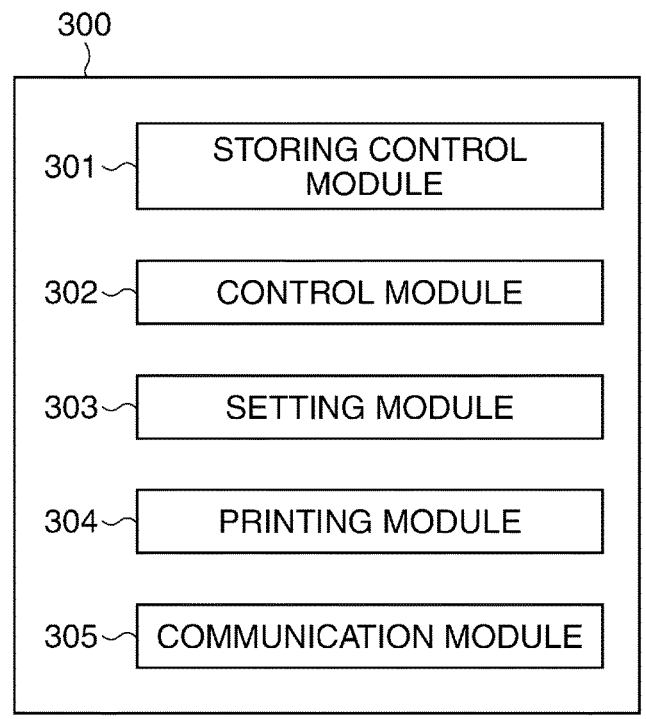
FIG. 3 is a view showing a configuration of a software module performed by the MFP in FIG. 1.
FIG. 4 is a view showing print-job attribute information used by the MFP in FIG. 1.

FIG. 3 is a view showing a configuration of the software module 300 performed by the MFP 102 in FIG. 1.

As shown in FIG. 3, the software module 300 is provided with a storing control module 301, a control module 302, a setting module 303, a printing module 304, and a communication module 305. When the CPU 201 performs a module read and developed to the RAM 202, a process corresponding to the module concerned is performed.

The storing control module 301 stores the locally reserved print data and the remotely reserved print data that is transferred from the MFP 103 into the auxiliary storage unit 203. When the CPU 201 obtains the notice of a print instruction that instructs execution of print jobs, such as a locally reserved print job and a remotely reserved print job, from the client PC 101 or the operation unit 205, the control module 302 analyzes print job attribute information 400 that is shown in FIG. 4 and is included in the notice of the print instruction.

The print job attribute information 400 includes a job name 401, a job owner name 402, a date 403, a print setting 404, a storage location 405, a printing-possible state 406, a printing state 407, and a transferring state 408. A print job name that specifies a print job is included in the job name 401. A user name that specifies a user who instructed execution of the print job is included in the job owner name 402d. Information about the date on which the execution of the print job was instructed is included in the date 403.

Various print setting information, such as a one-sided/double-sided setting and a color mode setting, is included in the print setting 404. The IP address information corresponding to the storage location of the print data for the print job is included in the storage location 405. The information showing whether the print job can be performed is included in the printing-possible state 406. In the embodiment, "OK", which means that the print job concerned is executable, is set for the print job of which print data is stored in the auxiliary storage unit 203. And "NG", which means that the print job is not executable, is set for the print job of which print data is not stored in the auxiliary storage unit 203.

Information according to the progress situation of the print job is set to the printing state 407. Specifically, default information of a space (Null) is set to the printing state 407, and information representing "Printing" and information representing "Printed" will be set according to the progress situation of the print job. Information according to the transfer situation of the remotely reserved print data is set to the transferring state 408. Specifically, default information of a space (Null) is set to the transferring state 408, and information representing "Transferring" and information representing "Transferred" will be set according to the transfer situation of the remotely reserved print data.

The setting module 303 sets up about a process using the setting information about the MFP 102 stored in the auxiliary storage unit 203 etc. In the embodiment, the setting module 303 sets up about a reservation printing on the basis of the input information input through the reservation print setting screen 500 shown in FIG. 5 and the printing order setting screen 600 shown in FIG. 6.

The reservation print setting screen 500 includes an ON button 501 that is used to allow execution of the reservation printing, an OFF button 502 that is used to prohibit execution of the reservation printing, and an OK button 503 that is used to complete the setting in the reservation print setting screen 500. In the embodiment, when an apparatus manager of the MFP 102 presses the OK button 503 after pressing the ON button 501 in the reservation print setting screen 500, the MFP 102 becomes possible to execute the reservation printing. On the other hand, when the apparatus manager of the MFP 102 presses the OK button 503 after pressing the OFF button 502, the MFP 102 becomes impossible to execute the reservation printing, and performs the print job on the basis of the print data concerned without reserving the print data.

The printing order setting screen 600 includes a selection order priority button 601 and a speed priority button 602 that are used for setting the execution order of the print jobs in a reservation printing process shown in FIG. 7 mentioned later.

Furthermore, an OK button 603 that is used to complete the setting in the printing order setting screen 600 is included in the printing order setting screen 600. In the embodiment, when the apparatus manager of the MFP 102 presses the OK button 603 after pressing the selection order priority button 601 in the printing order setting screen 600, the setting module 303 sets up a selection order priority mode in which the print jobs are performed according to the order selected in a print data list screen 800 shown in FIG. 8A mentioned later that is displayed on the display unit 204.

On the other hand, when the apparatus manager of the MFP 102 presses the OK button 603 after pressing the speed priority button 602 in the printing order setting screen 600, the setting module 303 sets up a speed priority mode that gives priority to execution of the locally reserved print job over execution of the remotely reserved print job. The printing module 304 controls the printing unit 207 to perform a print job. The communication module 305 controls the communication unit 210 to perform the transfer process for the remotely reserved print data.

Figure 7:
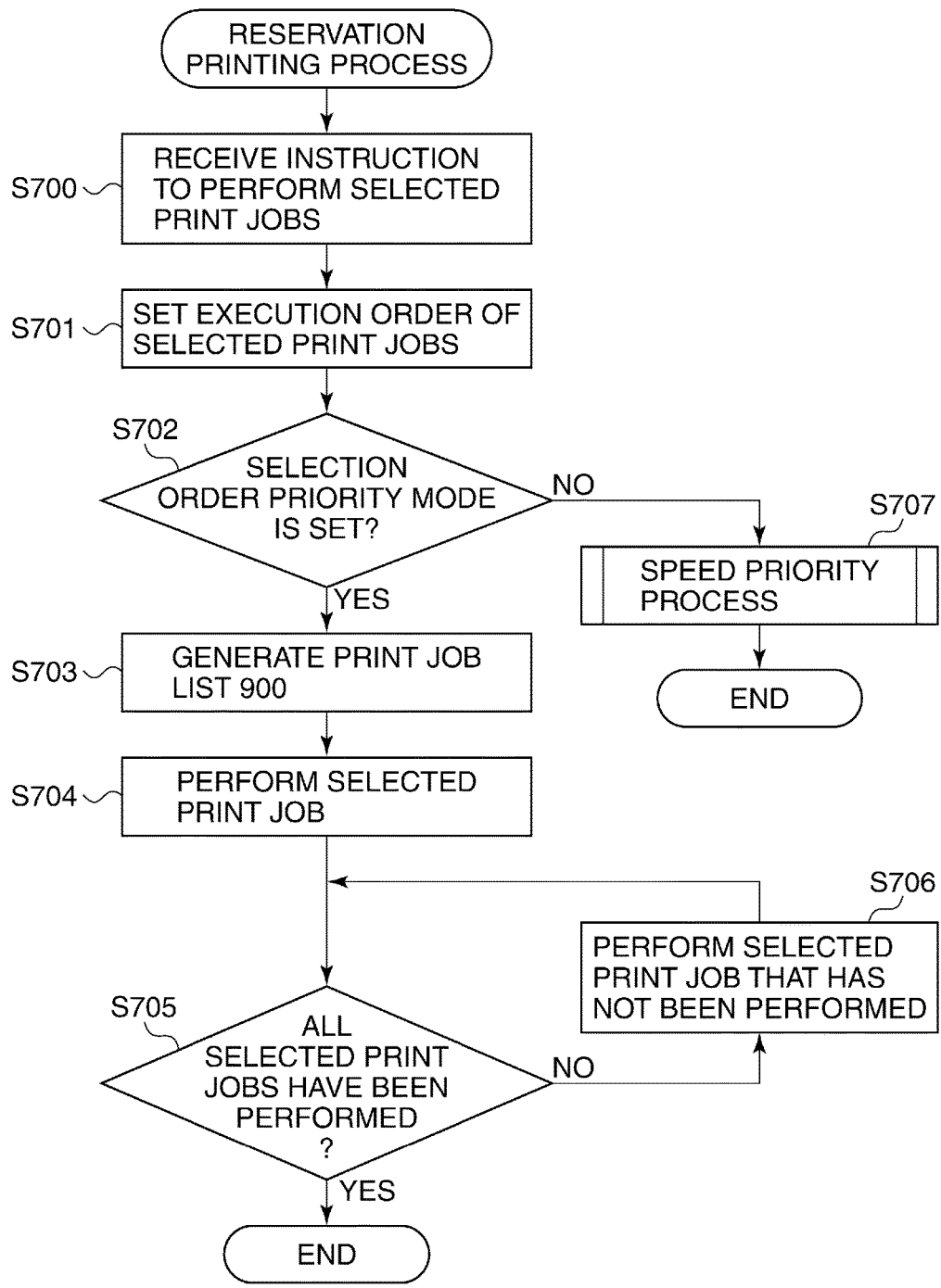
FIG. 7 is a flowchart showing procedures of a reservation printing process performed by the MFP in FIG. 1.

FIG. 7 is a flowchart showing procedures of the reservation printing process performed by the MFP 102 in FIG. 1.

The process in FIG. 7 is performed when the CPU 201 performs the software module 300 read from the auxiliary storage unit 203 to the RAM 202 under the condition where a user has logged in to the MFP 102 in order to instruct executions of print jobs, such as a locally reserved print job and a remotely reserved print job.

Figure 8A:
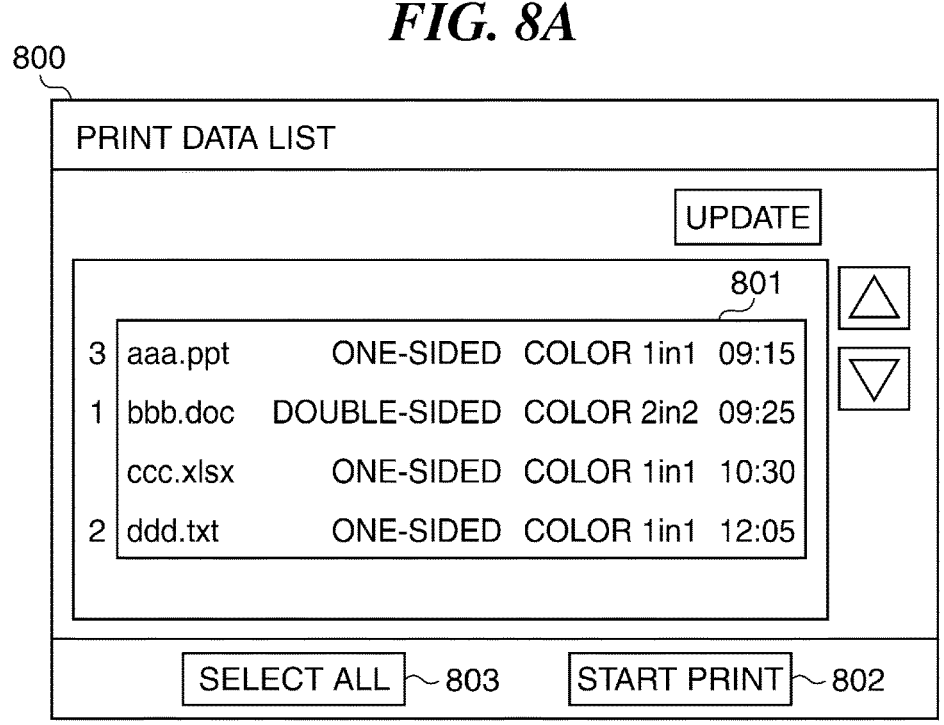
FIG. 8A and FIG. 8B are views showing a print data list screen displayed on the display unit in FIG. 2.

In the process in FIG. 7, the CPU 201 first displays the print data list screen 800 shown in FIG. 8A on the display unit 204 in order to select print data. The print data list screen 800 includes a print data information group 801 that includes the information about the locally reserved print data and the information about the remotely reserved print data, a printing start button 802 that is used to instruct execution of a print job, and a select-all button 803 that is used to instruct selection of all the print data included in the print data information group 801. Print data is added to the print data information group 801 in the order of reservation. In the print data list screen 800, the number representing the selection order is added to print data corresponding to an area pressed by the user.

Figure 8B:
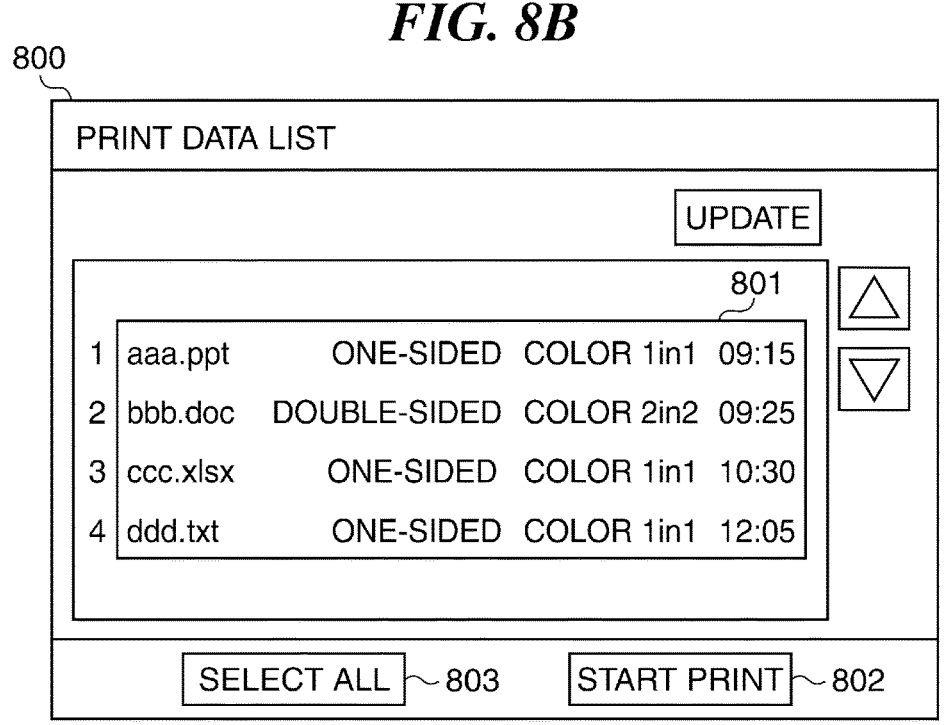

Moreover, when the user presses the select-all button 803 in the print data list screen 800, the serial numbers are added to all the print data sequentially from the top as shown in FIG. 8B. Next, when the user presses the printing start button 802, the CPU 201 receives an instruction to perform the print jobs (hereinafter referred to as "selected print jobs") for the selected print data (step S700, a receiving unit).

It should be noted that the embodiment describes a case where execution of a plurality of print jobs including a locally reserved print job and a remotely reserved print job is instructed as an example. Next, the CPU 201 sets up the execution order of the selected print jobs on the basis of the selection order of the selected print data (step S701, a setting unit), and checks which of the selection order priority mode and the speed priority mode is set. The apparatus manager of the MFP 102 shall set the selection order priority mode or the speed priority mode beforehand.

Figure 9:
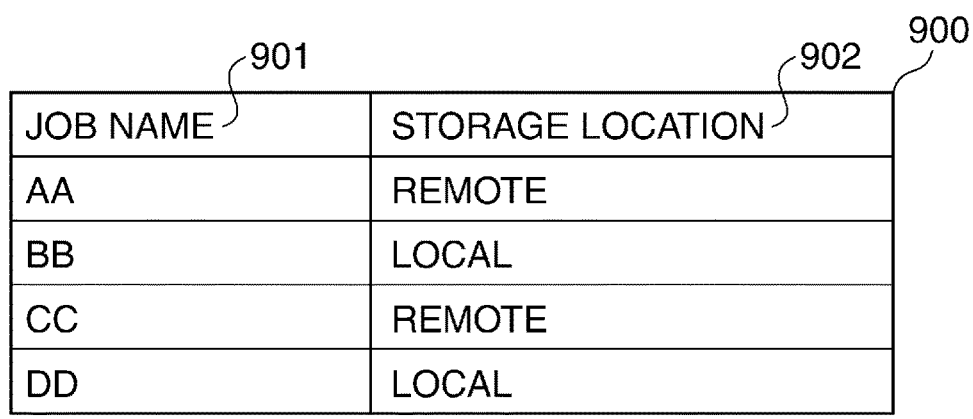
FIG. 9 is a view showing a print job list used by the MFP in FIG. 1.

As a result of the check in the step S702, when the selection order priority mode is selected, the CPU 201 obtains the print job attribute information 400 corresponding to each of the selected print jobs, and generates a print job list 900 that defines the execution order of the selected print jobs as shown in FIG. 9 on the basis of the obtained print job attribute information 400 and the set-up execution order (step S703).

The print job list 900 includes a job name 901 and a storage location 902 for each of the selected print jobs. Information about a selected print job is added to the print job list 900 in the order from the selected print job performed first. The job name 901 includes the print job name corresponding to the job name 401 included in the print job attribute information 400. The storage location 902 includes the information representing the storage location of the selected print data used for each of the selected print jobs.

In the embodiment, it is determined whether the IP address of the storage location 405 included in the print job attribute information 400 corresponding to each of the selected print jobs coincides with the IP address of the MFP 102, and the information representing the storage location of the selected print data used for each of the selected print jobs is set up on the basis of the determined result concerned. For example, "local" representing that the storage location of the selected print data is the MFP 102 is set to each of the print jobs BB and DD whose IP address of the storage location 405 included in the print job attribute information 400 coincides with the IP address of the MFP 102.

On the other hand, "remote" representing that the storage location of the selected print data is not the MFP 102 is set to each of the print jobs AA and CC whose IP address of the storage location 405 included in the print job attribute information 400 does not coincide with the IP address of the MFP 102. Next, the CPU 201 performs the selected print jobs included in the print job list 900 sequentially from the top selected print job (step S704, a print-job execution unit). Next, the CPU 201 determines whether all the selected print jobs in the print job list 900 have been performed (step S705).

As a result of the determination in the step S705, when not all the selected print jobs in the print job list 900 have been performed, the CPU 201 performs a selected print job that has not been performed among the selected print jobs in the print job list 900 (step S706, a print-job execution unit), and returns the process to the step S705.

As a result of the determination in the step S705, when all the selected print jobs included in the print job list 900 have been performed, the CPU 201 finishes this process.

Figure 10:
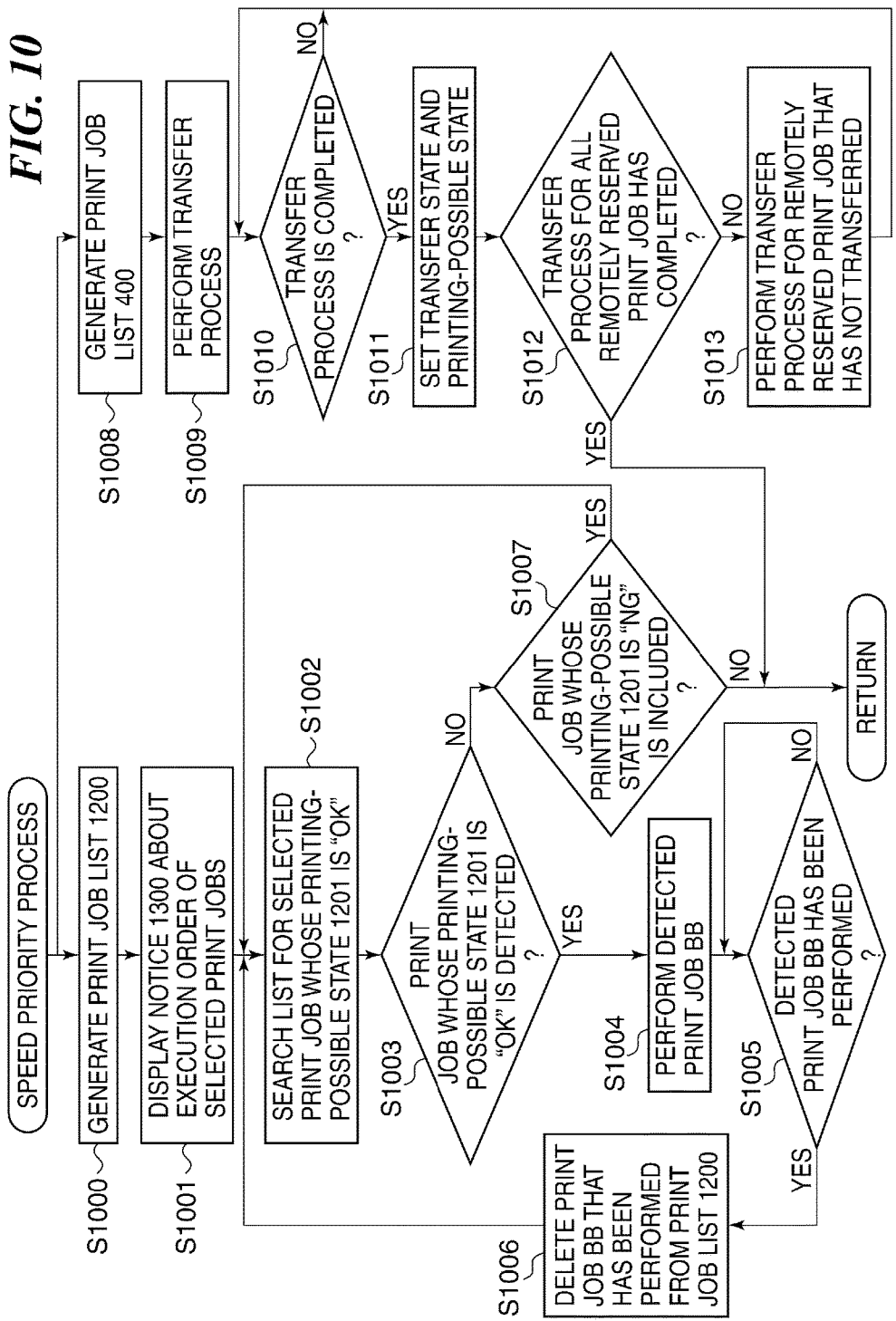
FIG. 10 is a flowchart showing procedures of a speed priority process in the step S707 in FIG. 7.

As a result of the determination in the step S702, when the speed priority mode is set up, the CPU 201 performs a speed priority process in FIG. 10 (step S707), and finishes this process.

In the selection order priority mode, the print job AA and the print job BB are performed in this order as shown in FIG. 11A. In this case, the transfer of the remotely reserved print data used for the print job AA from the MFP 103 starts after the user instructs execution of the print jobs AA and BB, and the execution of the print job AA starts after the transfer is completed. That is, since the first print job AA is not performed unless the transfer of the remotely reserved print data used for the print job AA is completed, the FPOT after the execution instruction of the print jobs AA and BB becomes comparatively long time T1.

Next, the procedures of the speed priority process in the step S707 in FIG. 7 will be described with reference to the flowchart shown in FIG. 10.

In FIG. 10, the CPU 201 first obtains the print job attribute information 400 corresponding to the selected print data, and generates a print job list 1200 shown in FIG. 12A on the basis of the obtained print job attribute information 400 and the set-up execution order (step S1000).

The information about the selected print job is added to the print job list 1200 in the order of selection. Moreover, the print job list 1200 includes a printing-possible state 1201 corresponding to the printing-possible state 406 included in the print job attribute information 400 and a printing state 1202 corresponding to the printing state 407 included in the print job attribute information 400 in addition to the job name 901 and the storage location 902 in the print job list 900 in FIG. 9, for every selected print job. It should be noted that a process in steps S1000 through S1007 is performed in parallel to a process in steps S1008 through S1013 in the embodiment.

Next, the CPU 201 displays a notice 1300 about the execution order of the selected print jobs shown in FIG. 13 (step S1001, a notice display unit). Next, the CPU 201 searches the print job list 1200 for the selected print job whose printing-possible state 1201 is "OK" (step S1002).

In the printing-possible state 1201, "OK" is set to the selected print job of which the selected print data has been already stored in the auxiliary storage unit 203, and "NG" is set to the selected print job of which the selected print data is not stored in the auxiliary storage unit 203. Next, the CPU 201 determines whether the selected print job of which the printing-possible state 1201 is "OK" was detected (step S1003).

As a result of the determination in the step S1003, when the selected print job whose printing-possible state 1201 is "OK" is detected, for example, when the print job BB whose printing-possible state 1201 is "OK" is detected, the CPU 201 performs the detected print job BB (step S1004, a print-job execution unit). That is, in the speed priority mode, the print job BB of which the printing-possible state 1201 is "OK" is first performed irrespective of the set-up execution order.

After that, the CPU 201 sets the printing state 1202 of the print job BB that is being performed in the print job list 1200 to "Printing" as shown in FIG. 12B.

When completing the execution of the print job BB (YES in the step S1005), the CPU 201 deletes the print job BB that has been performed from the print job list 1200 as shown in FIG. 12C (step S1006), and returns the process to the step S1002.

As a result of the determination in the step S1003, when a selected print job whose printing-possible state 1201 is "OK" is not detected, the CPU 201 determines whether the selected print job whose printing-possible state 1201 is "NG" is included in the print job list 1200 (step S1007).

As a result of the determination in the step S1007, when a selected print job of which the printing-possible state 1201 is "NG" is included in the print job list 1200, the CPU 201 returns the process to the step S1002.

As a result of the determination in the step S1007, when no selected print job of which the printing-possible state 1201 is "NG" is included in the print job list 1200, the CPU 201 determines that the execution of all the selected print jobs is completed, finishes this process, and returns to the process in FIG. 7.

On the other hand, the CPU 201 generates a transfer control list 1400 shown in FIG. 14A for managing the transfer situation of a remotely reserved print job among the selected print jobs in parallel to the process in steps S1000 through S1007 (step S1008). That is, a remotely reserved print data is transferred in parallel to execution of a selected print job in the embodiment.

The transfer control list 1400 includes a transferring state 1401 corresponding to the transferring state 408 in the print job attribute information 400 in addition to the job name 901 and the storage location 902 as with the print job list 900 for every remotely reserved print job.

Next, the CPU 201 transfers the top remotely reserved print job included in the transfer control list 1400 (step S1009). For example, the remotely reserved print data used for print job AA is transferred.

Next, the CPU 201 sets the transferring state 1401 of the print job AA that is subjected to the transfer process for the remotely reserved print data in the transfer control list 1400 to "Transferring" as shown in FIG. 14B.

After that, when the transfer process for the remotely reserved print data used for the print job AA is completed (YES in the step S1010), the CPU 201 sets the transfer state 1401 of the print job AA in the transfer control list 1400 to "transferred" as shown in FIG. 14C, and sets the printing-possible state 1201 of the print job AA in the print job list 1200 to "OK" as shown in FIG. 12D (step S1011). Accordingly, the print job AA becomes possible to perform. Next, the CPU 201 determines whether the transfer process for all the remotely reserved print data included in the transfer control list 1400 has completed (step S1012).

As a result of the determination in the step S1012, when the transfer process for any remotely reserved print data used for one of the remotely reserved print jobs included in the transfer control list 1400 is not completed, the CPU 201 performs the transfer process for the remotely reserved print data to which the transfer process is not performed (step S1013), and returns the process to the step S1010.

As a result of the determination in the step S1012, when the transfer process for all the remotely reserved print data used for the remotely reserved print jobs included in the transfer control list 1400 is completed, the CPU 201 finishes this process.

Even when according to processing of FIG. 10 it is set up so that print job AA of the remotely reserved print data accompanied by the transfer from MFP 103 may be performed first, the print job BB of a locally reserved print data is performed first. Accordingly, since the print job AA is able to be performed without waiting until the transfer of the remotely reserved print data from the MFP 103 is completed, the FPOT becomes T2 that is shorter than T1 as shown in FIG. 11B, which enables to prevent the FPOT from becoming longer beyond necessity.

Moreover, since the transfer process for the remotely reserved print data used for the print job AA is performed in parallel to the execution of the print job BB, the time during the execution of the print job BB is used efficiently, which shortens the total execution time required to perform the print jobs AA and BB.

Moreover, since the notice 1300 about the execution order of the selected print jobs is displayed when the print job BB is performed ahead of the print job AA according to the process in FIG. 10, a user is not confused about the execution order of the print jobs.

Although the present invention was described above using the embodiment, the present invention is not limited to the embodiment mentioned above.

For example, when all the print data is selected by pressing the select-all button 803 in the selection order priority mode, the priority is given to the execution of the print job AA for the remotely reserved print data rather than the execution of the print job BB for the locally reserved print data in the embodiment. However, when the select-all button 803 is pressed, the speed priority mode may be automatically set. In such a case, since the print job BB is performed prior to performing the print job AA, the FPOT is certainly prevented from becoming longer beyond necessity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-032775, filed Feb. 23, 2015, which is hereby incorporated by reference herein in its entirety.

What is claimed is:

1. An image processing apparatus comprising:
    a user interface configured to receive an instruction from a user,
    a storage device storing first print data; and
    a controller, having a processor that executes instructions stored in a memory or having circuitry, configured to execute:
        a setting receiving task that receives a setting of one mode from among a plurality of modes, including a specific mode;
        a receiving task that receives, from the user interface, a print instruction for printing selected plural sets of print data, including the first print data stored in the storage device, second print data stored in an external device, and third print data that is stored in the external device;
        a determining task that determines, in accordance with information about each storage location of the first print data, the second print data, and the third print data, a printing order thereof, where the first print data, which is stored in the storage device, is printed before the second and third print data, which are stored in the external device; and
        a control task that controls an image forming device to print the plural sets of print data in accordance with the determined printing order,
    wherein the control task allows the image forming device to print a third image based on the third print data after printing a first image based on the first print data, but before printing a second image based on the second print data, in accordance with the received print instruction, in a case where the setting receiving task receives the setting of the specific mode.

2. The image processing apparatus according to claim 1, wherein, in accordance with the received print instruction, the control task receives:

the first print data from the storage device and controls the image forming device to print the received first print data; and the second print data from the external device and controls the image forming device to print the received second print data.

3. The image processing apparatus according to claim 2, wherein the control task receives the second print data from the external device while the image forming device is printing the first print data.

4. The image processing apparatus according to claim 1, wherein the receiving task receives the print instruction, where the plural sets of print data are selected in order, one by one.

5. The image processing apparatus according to claim 4, wherein the controller is further configured to execute a notification task that notifies the user of a possibility that a print order of the selected plural sets of print data is different from the selected order of the plural sets of print data.

6. The image processing apparatus according to claim 4, wherein in a case where the setting receiving task receives the setting of the specific mode, the control task controls the image forming device to print the first image based on the first print data before printing the second image based on the second print data and the third image based on the third print data, in accordance with the received print instruction, regardless of the selected order of the plural sets of print data.

7. The image processing apparatus according to claim 1, wherein the receiving task receives the print instruction, where the first print data is selected and thereafter the third print data is selected.

8. The image processing apparatus according to claim 1, wherein the controller further executes a storing task that stores, in the storage device, a job list information identifying print data stored in the storage device and print data stored in the external device.

9. A control method for an image processing apparatus having a user interface configured to receive an instruction from a user, the control method comprising:

a storing step of storing first print data in a storage device;

a setting receiving step of receiving a setting of one mode from among a plurality of modes, including a specific mode;

a receiving step of receiving, via the user interface, a print instruction for printing selected plural sets of print data, including the first print data stored in the storage device, second print data stored in an external device, and third print data stored in the external device;

a determining step of determining, in accordance with information about each storage location of the first print data, the second print data, and the third print data, a printing order thereof, where the first print data, which is stored in the storage device, is printed before the second and third print data, which are stored in the external device; and a control step of controlling an image forming device to print the selected plural sets of print data in accordance with the determined printing order, wherein the control step allows the image forming device to print a third image based on the third print data after printing a first image based on the first print data, but before printing a second image based on the second print data, in accordance with the received print instruction, in a case where the setting receiving step receives the setting of the specific mode.

10. An image processing comprising:

a user interface configured to receive an instruction from a user;

a storage device storing first print data; and a controller, having a processor that executes instructions stored in a memory or having circuitry, configured to execute:

a setting receiving task that receives a setting of one mode from among a plurality of modes, including a specific mode;

a receiving task that receives, from the user interface, a print instruction for printing selected plural sets of print data, including first print data stored in the storage device, second print data stored in an external device, and third print data stored in the external device;

a determining task that determines a printing order of the plural sets of print data, where locally-stored print data is given priority over remotely-stored print data;

a control task that controls an image forming device to form an image of the selected plural sets of print data in accordance with the determined printing order, wherein the control task allows the image forming device to print a third image based on the third print data after printing a first image based on the first print data, but before printing a second image based on the second print data, in accordance with the received print instruction, in a case where the setting receiving task receives the setting of the specific mode.

11. The image processing apparatus according to claim 10, wherein, in accordance with the received print instruction, the control task receives:

the first print data from the storage device and controls the image forming device to print the received first print data; and the second print data from the external device and controls the image forming device to print the received second print data.

12. The image processing apparatus according to claim 10, wherein the control task receives the second print data from the external device while the image forming device is printing the first print data.

13. The image processing apparatus according to claim 10, wherein the receiving task receives the print instruction, where the plural sets of print data are selected in order, one by one.

14. The image processing apparatus according to claim 13, wherein the controller is further configured to execute a notification task that notifies the user of a possibility that a print order of the selected plural sets of print data is different from the selected order of the plural sets of print data.

15. The image processing apparatus according to claim 10, wherein the controller further executes a storing task that stores, in the storage device, a job list information identifying print data stored in the storage device and print data stored in the external device.

* * * * *